Figure 1:
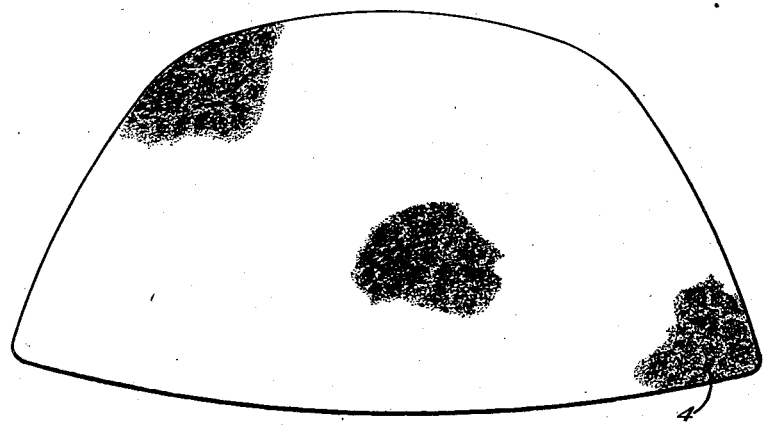

Jan. 6, 1942.	W. B. TUCKER	2,268,729
BOX TOE AND METHOD OF MAKING THE SAME
Filed April 11, 1940

Inventor
William B. Tucker
by
Walter + Kaufman
Attorney

Patented Jan. 6, 1942

2,268,729

UNITED STATES PATENT OFFICE 2,268,729

BOX TOE AND METHOD OF MAKING THE SAME

William B. Tucker, Lancaster Township, Lancaster County, Pa., assignor to Armstrong Cork Company, Lancaster, Pa., a corporation of Pennsylvania Application April 11, 1940, Serial No. 329,016

6 Claims. (Cl. 12—146)

This invention relates to an impregnated or coated fibrous fabric suitable for making shoe stiffeners such as box-toes, counters, and the like, box-toes made therefrom, and processes of making the same.

An object of the invention is to provide a material which in an early stage of its manufacture is sufficiently flexible and plastic to permit its being shaped upon a form, for example, on a last used in making a shoe, and which on setting becomes sufficiently rigid, inextensible, tough, and resilient to maintain its shape when subjected to the usual stresses accompanying the wearing of the shoe.

A further object of the invention is to provide a fabric having unusually good stability to temperature, moisture, and perspiration.

A further object of the invention is to provide a material suitable for making box-toes which may have any desired degree of hardness and resiliency and which may be made from a single type of fabric merely by varying the proportions of the ingredients of a saturating, impregnating, or coating dispersion to be applied to the fabric, and, to use a dispersion or solution of such a nature for saturating or coating that the time of setting may be readily controlled so that it may be made up and applied to the fabric in the shoe factory at the point in the course of the usual operations in making shoes where the box-toe is applied to the shoe, thus obviating the necessity of carrying an adequate stock of various types of box-toes or other shoe stiffening material for different uses. A further advantage is the fact that no inflammable solvents or other means need be used to soften the box-toes prior to their insertion in the shoe.

These objects are accomplished by applying to a fibrous fabric or web carrier such as napped flannel, double-napped and single-napped, unnapped fabric, paper, paper felt, textile felt, burlap or any other suitable carrier so as to saturate both sides thereof, a coating or impregnating dispersion including a rubber latex and a hydraulic setting material such as a hydraulic cement, for example, Portland cement, or aluminous cement. The rubber dispersion may be ordinary latex or may be a special concentrated latex, but if too concentrated, additional water may be added to the mixture with the cement to facilitate coating. Other rubber dispersions, such as those made by dispersing natural or synthetic rubber, artificially produced latex, vulcanized latex, as well as those of gutta percha and balata gums, may be used. The dispersions may be stabilized with soaps and protein material such as glue and casein.

The coating may be applied to continuous strips of fabric or to short strips thereof, or it may be applied to blanks of material cut to the proper size and shape to form the desired product, such as box-toes, counters for shoes, or any other desired articles. If the impregnating material is applied to box-toe blanks or counters, they may also be previously skived, if necessary or desirable. By using blanks of fabric cut to proper size and shape for making box-toes, considerable economy is effected since there is no loss of the relatively expensive impregnating material by cutting out the desired pieces from an uncut impregnated fabric. Heretofore, the box-toes were cut from a sheet of material containing expensive substances, such as Celluloid or thermoplastic materials, the odd shapes resulting in waste of considerable material between the areas stamped or cut out to form the box-toes and it was necessary to use solvents, heat, pressure or other means to soften them. As stated above, the coating of this invention may be applied to the blanks in the course of operations at the shoe factory and no heat, pressure, solvents, or other softening means need be used, since the box-toes are preferably lasted in the shoe while they are in a plastic state prior to complete setting of the material. The coated blank may be inserted in the shoe while the coating is still sufficiently adhesive in nature to form a bond between the lining and the doubler used in the shoe, and of such consistency that proper pulling over thereof may be conveniently effected. However, it is not essential that the toe be lasted while the impregnant is in an adhesive condition since it is obvious that an additional adhesive may be applied, although it has been found that good attachment can be obtained from the impregnating material itself. Furthermore, a box-toe made of the material of the proper size and shape may be completely set prior to insertion in the shoe.

Alternatively, in the making of shoes, the fabric may be coated with the cement at one plant and then shipped to the shoe-making plant where it may be impregnated with the latex. Also, the fabric may be impregnated with latex at one plant and then shipped to the shoe factory where it may be coated with cement just prior to application in the shoe. A modified procedure is to pass the fabric through a concentrated latex and then into a dust chamber where the cement would be kept in suspension by air circulation and then deposit this dust on the latex saturated fabric after which the material may be applied to the shoe.

After the fabric has been impregnated with both materials, either by separate application or together, it may be allowed to dry, to a condition of initial set wherein it is still plastic, which may require half an hour to an hour. The coated fabric may be treated with a coagulating agent, such as aluminum chloride, ammonium chloride, or the like, to shorten the time of initial setting. The material is sufficiently plastic after the initial set to permit working and shaping and it is in this stage that box-toes made of the material are lasted in the shoes. After being formed in the shoes, the box-toe materials continue to harden and set to produce a material having rigidity imparted by the fabric in combination with the hardened cement, having resiliency, flexibility and toughness imparted by the rubber matrix which contains the cement, and having high tensile strength and inextensibility imparted by the fabric base imbedded in the coherent matrix of hardened cement and coagulated rubber. The hardness of the final material may be increased by increasing the amount of cement, or on the other hand, its flexibility, resiliency, and toughness may be increased by increasing the amount of latex in the mixture thereby producing various materials having a wide range of characteristics. By mixing in pigments or dyes, the coating material may be made in any color, and the color of the final product, such as a box-toe, may be made to match the color of the leather employed in the shoe upper, thus eliminating the necessity of applying a separate coloring coating to the box-toe to match the color of the upper in perforated shoes. Rubber curing or vulcanizing agents may be added to the mixture, if desired, but are not essential. Additional fillers may be added, for example, cork may be used to produce soft box-toes.

*Example 1*

| | Parts by weight |
|---|---|
| Latex stabilized by 0.67% casein (65.3% dry rubber content) | 100 |
| Aluminous cement | 130 |
| Water | 45 |

The ingredients were mixed in any order and zinc dibutyl dithiocarbamate, sulfur, and di-β-naphthyl-paraphenylenediamine were added in suitable amounts.

A double-napped cotton flannel was impregnated with the above material. After saturating the fabric, it was drawn between rods to remove excess saturant, and allowed to stand in air for thirty minutes to an hour. The fabric was then cut to the size and shape desired to form a box-toe. Thereupon the box-toe material was assembled on a last to form a shoe in the usual manner. Examination of the shoe showed that the stiffener was firm and flexible.

*Example 2*

| | Parts by weight |
|---|---|
| Latex stabilized by 0.67% casein (65.3% dry rubber content) | 100 |
| Aluminous cement | 175 |
| Water | 30 |

The mixture was made by stirring the cement and powdered rubber curing agents such as those of Example 1 into the latex and then adding water.

Two types of double-napped cotton flannel were saturated with the mixture, a heavier and a thinner material. After saturation, the thinner material was drawn through the space between rods held apart by means of shims having a thickness of .085". The heavier material was drawn between rods spaced apart by 0.120". After allowing the pieces to stand in air for about forty minutes, they were assembled in the usual manner to form box-toes in shoes. Both sets of materials were hard and in the finished shoes, they exhibited good adhesion to the other materials used.

*Example 3*

Double-napped cotton flannel blanks cut to the proper size and shape to make box-toes and beveled at the breast edge area were treated in the saturant mixture of Example 2 and were then drawn between rods which were set to an opening of .090". After allowing the box-toe blanks to stand in the air for thirty to forty minutes, they were lasted in the usual manner to form box-toes in shoes. The box-toes resulting were firm and resilient.

*Example 4*

Two hundred parts of dry aluminous cement were dispersed in sixty parts of water and were mixed with one hundred parts of a stabilized concentrated rubber dispersion. The dispersion was stabilized by the addition of twenty-two parts of a 10% casein solution in ammonia and water to one hundred parts of dispersion having a total solid content of 73%. Medium stiff flannel blanks, cut to the proper size and shape, were immersed in the saturant, which was pressed into the fabric with a wide spatula. After allowing the blanks to dry for about forty-five minutes, the box-toes were lasted in shoes in the usual manner.

*Example 5*

Blanks of material such as used in Example 4 were treated with the saturant described in Example 4, but instead of allowing them to dry in the air after saturation, they were treated with a 25% solution of ammonium chloride to permit their immediate insertion in shoes without previous drying. The toes were lasted in shoes in the usual manner.

Figure 2:
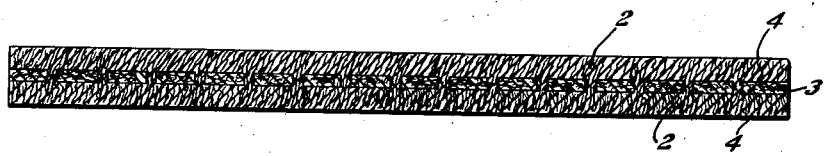

In the drawing, Figure 1 is a plan view illustrating one desired shape of a box-toe in accordance with this invention, with parts 4 showing the appearance of the surface of the material as finally produced. Figure 2 shows diagrammatically a cross section of the material when made from a double-napped flannel type fabric 3 in which the napping 2 is imbedded on both sides with the saturant 4 which forms, in effect, a matrix substantially completely encasing the fabric. The material may be described as comprising a fabric base imbedded in a matrix of the impregnant material. The impregnant matrix may have any thickness depending upon the flexibility desired.

In the claims, the expressions "rubber" and "rubber dispersion" are intended to include synthetic as well as natural ruber, both artificially and naturally produced dispersions of rubber vulcanized latex and also such materials as balata and gutta percha gums.

While the preceding description mentions specific examples and specific proportions of materials, such description is to be considered merely illustrative and the scope of this application is intended to include any modification within the spirit of the claims below.

I claim:

1. A method of making a shoe comprising the steps of impregnating a fibrous web with a mixture of a hydraulic setting cement and a rubber dispersion, treating the impregnated web with a coagulating agent, and lasting the impregnated web in the toe of a shoe.

2. A method of making a shoe comprising the steps of impregnating a fibrous web with a mixture of a hydraulic setting cement and a rubber dispersion, treating the impregnated web with ammonium chloride, and lasting the impregnated web in the toe of a shoe.

3. A shaped shoe stiffener comprising a fibrous web impregnated with a mixture of a sufficient amount of a hydraulic cement and a rubber dispersion as to be held in its shaped condition by the setting of the cement.

4. A shaped shoe stiffener comprising a fibrous web impregnated with a mixture of a sufficient amount of a hydraulic cement, a rubber dispersion and vulcanizing ingredients as to be held in its shaped condition by the setting of the cement.

5. A shoe having therein a shaped shoe stiffener comprising a fibrous web impregnated with a mixture of a sufficient amount of a hydraulic cement and a rubber dispersion as to be held in its shaped condition by the setting of the cement.

6. A shoe having therein a shaped shoe stiffener comprising a fibrous web impregnated with a mixture of a sufficient amount of a hydraulic cement, a rubber dispersion and vulcanizing ingredients as to be held in its shaped condition by the setting of the cement.

WILLIAM B. TUCKER.